United States Patent [19]

Becker et al.

[11] Patent Number: 4,695,438

[45] Date of Patent: * Sep. 22, 1987

[54] SELECTIVE CATALYTIC REDUCTION CATALYSTS

[75] Inventors: E. Robert Becker; Hyun J. Jung, both of Wayne, Pa.

[73] Assignee: Johnson Matthey, Inc., Malvern, Pa.

[ * ] Notice: The portion of the term of this patent subsequent to Sep. 22, 2004 has been disclaimed.

[21] Appl. No.: 874,153

[22] Filed: Jun. 13, 1986

[51] Int. Cl.$^4$ .................. B01J 8/00; B01J 27/053; B01J 27/043; C01B 21/00
[52] U.S. Cl. .................................. 423/239; 502/217; 502/222
[58] Field of Search ................ 423/235, 235 D, 239, 423/239 A, 244 A, 244 R; 502/217, 222

[56] References Cited

U.S. PATENT DOCUMENTS

| | | | |
|---|---|---|---|
| 3,857,921 | 12/1974 | Tamura et al. | 423/239 |
| 3,916,805 | 11/1975 | Kalfadolis et al. | 423/239 |
| 3,987,146 | 10/1976 | Clay et al. | 423/239 |
| 4,107,272 | 8/1978 | Mori et al. | 423/239 |
| 4,115,516 | 9/1978 | Takami et al. | 423/239 |
| 4,274,981 | 6/1981 | Suzuki et al. | 252/438 |

FOREIGN PATENT DOCUMENTS

| | | | |
|---|---|---|---|
| 51-96773 | 8/1976 | Japan | 423/239 |
| 52-65763 | 5/1977 | Japan | 423/239 |
| 54-4873 | 1/1979 | Japan | 423/239 |

*Primary Examiner*—Gregory A. Heller
*Attorney, Agent, or Firm*—Cushman, Darby & Cushman

[57] ABSTRACT

An SCR catalyst consisting essentially of iron sulfate or oxysulfur iron compound carried by a mixture of ceria and alumina on a support.

2 Claims, No Drawings

SELECTIVE CATALYTIC REDUCTION CATALYSTS

The present invention is concerned with an improved selective catalytic reduction catalyst. For ease of reference this catalyst is hereinafter referred to as an "SCR" catalyst.

BACKGROUND OF THE INVENTION

It is known to remove oxides of nitrogen ($NO_x$) pollutants from exhaust streams or other gaseous emission sources which contain excess oxygen by adding $NH_3$ to the gas and passing the resulting mixture over a catalyst so that the $NH_3$ and $NO_x$ react to form non-polluting $N_2$ and $H_2O$.

A wide variety of catalysts has been proposed for this purpose. One such catalyst is iron sulfate which has been described as an SCR catalyst in U.S. Pat. No. 4,107,272. However, study indicates that when iron sulfate is used as an SCR catalyst, the sulfate is really only stable in gases containing significant amounts of sulfur oxides ($SO_x$) and it appears to be rapidly deactivated at typical SCR temperatures such as 400° C., if the gas being treated, e.g. flue gas, only has at most a small amount (e.g. up to 200 ppm) of $SO_x$.

Thus, in the absence of any significant amounts of $SO_x$, iron sulfate is not stable at temperatures higher than approximately 350° C. and is decomposed to iron oxide, the SCR activity of the sulfate decreasing as the iron sulfate is decomposed to the oxide.

Natural gas is a common fuel, particularly in the United States, and flue gases generated from the combustion of natural gas are free of $SO_x$. As a consequence, iron sulfate cannot be utilized commercially as an SCR catalyst for such $SO_x$-free flue gases because of the rapid catalyst deactivation which takes place.

An ideal SCR catalyst is one which in practice has a high level of activity which is maintained over long periods of use whether or not $SO_x$ is present in the gas being treated. The principal purpose of the present invention is to provide such a catalyst.

GENERAL DESCRIPTION OF THE INVENTION

Broadly stated, the invention is based on the finding that iron sulfate, or equivalent iron oxysulfur compound, e.g. iron sulfite, can be effectively used as an SCR catalyst, whether or not the gas being treated contains $SO_x$, if the sulfate is supported on a carrier consisting of a mixture of cerium oxide ($CeO_2$) and alumina ($Al_2O_3$), the mixture itself being supported on a ceramic or metallic substrate or support material. It has been found that the catalyst including this combination of iron sulfate carried by a mixture of $CeO_2$ and $Al_2O_3$ has a much higher SCR activity than when iron sulfate is supported on ceria or alumina alone or when the ceria and alumina are used together without the sulfate.

The improved activity of the present catalyst is evidenced by a significantly increased selectivity for the reaction of $NH_3$ with $NO_x$. Additionally the present catalyst is much more stable or durable in use, i.e. the catalyst activity is maintained over longer periods of time than other iron sulfate SCR catalysts even in the absence of $SO_x$ in the gas being processed.

DETAILED DESCRIPTION OF THE INVENTION

As indicated, it is essential to the invention to use a mixture of ceria and alumina to carry or support the iron sulfate or other iron oxysulfur compound. The amount of ceria so used can be varied in the range of about 2–60% by weight based on the total weight of ceria and alumina. Preferably the amount of ceria comprises about 20 to 40% of the combined weight of ceria and alumina. This is equivalent to a ceria: alumina ratio of 1:4 to 2:3. However, effective results are also obtained using other ratios although it is essential to use at least 2% ceria. Amounts of ceria beyond 60% can be used but do not appear to significantly improve the catalyst performance.

The ceria/alumina carrier may be prepared in a variety of ways. Thus, for example, ceria or ceria precursor (e.g. cerium hydrate) and alumina powder or alumina precursor may be directly mixed together in the desired amounts, advantageously as a slurry in water. This may then be applied to any conventional ceramic or metal support material, e.g. a ceramic honeycomb made from cordierite or the equivalent as commercially available or high temperature alloy such as the Kanthal or Fecralloy type alloys, steels, etc. in conventional manner, followed by drying and calcining. The iron sulfate is thereafter applied, usually in the form of an aqueous solution or slurry, followed by drying and calcining.

The amount of iron sulfate in the catalyst will vary but, generally, it is sufficient to provide between 0.5 and 50% by weight iron, based on the weight of the ceria/alumina mixture.

It will be appreciated that the catalyst of the invention is used under conventional SCR conditions although, because of the greater selectivity or activity of the catalyst, less $NH_3$ and/or catalyst may be used to obtain effective $NO_x$ abatement than would be possible using conventional catalysts. Representative SCR conditions, using the present catalyst involve mixing $NH_3$ in the exhaust gas stream containing $NO_x$ at a molar ratio with the $NO_x$ of from 0.4 to 2.0, with or without $SO_x$, and contacting the mixture with the catalyst at a temperature of 250° C. to 500 ° C. at a GHSV of 1000 $hr^{-1}$ to 50,000 $hr^{-1}$. As noted, a particular advantage of the present catalyst is that it is not deactivated when used to treat $SO_2$-free flue gases or the like. This is in marked contrast to the case where iron sulfate is supported on alumina alone, such catalyst being rapidly deactivated in $SO_2$-free (e.g. up to 400 ppm) flue gas.

In a preferred embodiment, the invention is carried out as follows:

a washcoat is prepared by co-mingling $CeO_2$ and gamma-alumina and a conventional ceramic or metallic monolith is washcoated with the co-mingled $CeO_2$ and gamma-alumina. The washcoated monolith is then dried and calcined at 500° C. The washcoated monolith is impregnated with an aqueous solution of ferric sulfate, dried, and calcined at 300° C. to 500° C. In the SCR system, the catalyst is installed at a place in the waste gas where the temperature is in the range 350°–450° C. and $NH_3$ is injected into the gas upstream of the catalyst. The catalyst achieves NO removal in excess of 90% in the temperature range of 350°–450° C. with an $NH_3$/NO ratio of 1.0 and gas hour space velocity (GHSV) of 35,000 $hr^{-1}$.

The invention is illustrated, but not limited by the following examples:

EXAMPLE 1

A cordierite honeycomb monolith with 400 cells per square inch was washcoated with 5200 g of gamma-alumina per cubic foot volume of monolith. The washcoated monolith was dried and calcined at 500° C.

Comparative Example Catalyst A was prepared by impregnating the monolith with an aqueous solution of $Fe(NO_3)_3.9H_2O$ at a Fe loading of 170 g per cubic foot volume of monolith, drying the catalyst at 120° C. for 1 hour and further calcining it at 450° C. for 30 minutes.

Comparative Example Catalyst B was prepared by impregnating the monolith with an aqueous solution of $Fe_2(SO_4)_3.H_2O$ at a Fe loading of 340 g per cubic foot volume of monolith, in the same manner as above.

Comparative Example Catalyst C was prepared by aging Comparative Example Catalyst B for 72 hours at 400° C. in a flow of $SO_x$-free exhaust gas generated from the combustion of propane in excess of oxygen.

A continuous-flow reactor was loaded with a monolithic catalyst sample of 4.7 cubic inches. A simulated turbine exhaust gas consisting of 42 ppm NO, 15% $O_2$, 4.5% $CO_2$, 10% $H_2O$, and the balance of $N_2$ was introduced, after being admixed with 42 ppm $NH_3$, into the reactor at a flow rate of 45.05 standard liters per minute (35,000 $hr^{-1}$ GHSV) at a temperature of 300° to 500° C. The discharge gas was measured for NO concentration at the outlet of the reactor to determine relations between the catalyst temperature and the percent NO reduction. The results are given in Table 1.

It is evident from the reactor test results that iron sulfate supported on gamma-alumina is initially a more active SCR catalyst than iron nitrate supported on gamma-alumina. However, the sulfate is deactivated rapidly to become a poor SCR catalyst by aging in the absence of $SO_x$ at 400° C. Therefore, iron sulfate supported on gamma-alumina does not have the long term stability necessary to be commercially useful for selective $NO_x$ abatement from emission sources containing excess oxygen, particularly when the emission sources are free of oxides of sulfur.

EXAMPLE 2

A washcoat was prepared by co-mingling 156 g orthoboric acid and 1240 g gamma-alumina. A cordierite honeycomb monolith with 400 cells per square inch was washcoated with the co-mingled orthoboric acid and gamma-alumina. The washcoated monolith was then dried and calcined at 500° C. The monolith contained 620 g boria and 4910 g alumina per cubic foot volume of monolith.

Comparative Example Catalyst D was prepared by impregnating the monolith with an aqueous solution of $Fe(NO_3)_3.9 H_2O$ at a Fe loading of 130 g per cubic foot volume of monolith, drying the catalyst at 120° C. for 10 hour and further calcining it at 450° C. for 30 minutes.

Comparative Example Catalyst E was prepared by impregnating the monolith with an aqueous solution of $Fe_2(SO_4)_3.9H_2O$ at a Fe loading of 270 g per cubic foot volume of monolith, in the same manner as above.

Comparative Example Catalyst F was prepared by using Comparative Example Catalyst E for 100 hours at 400° C. in a flow of $SO_x$-free exhaust gas generated from the combustion of propane in excess of oxygen.

The catalyst samples were tested in the same manner as described in Example 1. The reactor test results presented in Table 1 show that iron sulfate supported on boria-containing gamma-alumina is not a durable SCR catalyst.

EXAMPLE 3

A cordierite honeycomb monolith with 400 cells per square inch was washcoated with 5200 g of gamma-alumina per cubic foot volume of monolith. The washcoated monolith was dried and calcined at 500° C. The washcoated monolith was then impregnated with an aqueous solution of orthophosphoric acid at a phosphorus loading of 130 g per cubic foot volume of monolith, dried, and then calcined at 500° C.

Comparative Example Catalyst G was prepared by impregnating the monolith with an aqueous solution of $Fe_2(SO_4)_3.H_2O$ at a Fe loading of 340 g per cubic foot volume of monolith, drying the catalyst at 120° C. for 1 hour and further calcining it at 450° C. for 30 minutes.

Comparative Example Catalyst H was prepared by aging Comparative Example Catalyst G for 100 hours at 400° C. in a flow of $SO_x$-free exhaust gas generated from the combustion of propane in excess of oxygen.

The catalyst samples were tested in the same manner as described in Example 1. The reactor test results presented in Table 1 show that iron sulfate supported on phosphorus-containing gamma-alumina is not a durable SCR catalyst.

EXAMPLE 4

A washcoat was prepared by co-mingling 1100 g anatase-type titania and 3200 g gamma-alumina. A cordierite honeycomb monolith with 400 cells per square inch was washcoated with the co-mingled titania and alumina. The washcoated monolith was then dried and calcined at 500° C. The washcoat loading was 4300 g per cubic foot volume of monolith.

Comparative Example Catalyst I was prepared by impregnating the monolith with an aqueous solution of $Fe_2(SO_4)_3.H_2O$ at a Fe loading of 210 g per cubic foot volume of monolith, drying the catalyst at 120° C. for 1 hour and further calcining it at 450° C. for 30 minutes.

Comparative Example Catalyst J was prepared by aging Comparative Example Catalyst I for 100 hours at 400° C. in a flow of $SO_x$-free exhaust gas generated from the combustion of propane in excess of oxygen.

The catalyst samples were tested in the same manner as described in Example 1. The reactor test results presented in Table 1 show that iron sulfate supported on titania-alumina is not a durable SCR catalyst.

EXAMPLE 5

A washcoat was prepared by co-mingling 1500 g ceria and 3000 g gamma-alumina. A cordierite honeycomb monolith with 400 cells per square inch was washcoated with the co-mingled ceria and alumina. The washcoat loading was 4500 g per cubic foot volume of monolith. Comparative Example Catalyst K was prepared by drying and calcining the washcoated monolith at 500° C. for 30 minutes.

Example Catalyst A was prepared by impregnating the monolith with an aqueous solution of $Fe_2(SO_4)_3.H_2O$ at a Fe loading of 150 g per cubic foot volume of monolith, drying the catalyst at 120° C. for 1 hour and further calcining it at 450° for 30 minutes.

Example Catalyst B was prepared by aging Example Catalyst A for 100 hours at 400° C. in a flow of $SO_x$-free exhaust gas generated from the combustion of propane in excess of oxygen.

The catalyst samples were tested in the same manner as described in Example 1. It is obvious from the reactor test results presented in Table 1 that iron sulfate supported on ceria-alumina has not only higher SCR activity than iron sulfate supported on alumina alone or than the ceria-alumina carrier alone, but also superior durability (lifetime).

TABLE 1

| Catalyst | Iron Salt | Alumina Modifier | Fresh/ Aged | Percent NO Reduction (%) at 350° C. | 400° C. | 450° C. |
|---|---|---|---|---|---|---|
| Comparative A | Fe(NO$_3$)$_3$.9 H$_2$O | None | Fresh | 52 | 67 | 71 |
| Comparative B | Fe$_2$(SO$_4$)$_3$.H$_2$O | None | Fresh | 84 | 94 | 94 |
| Comparative C | Fe$_2$(SO$_4$)$_3$.H$_2$O | None | Aged | 43 | 55 | 62 |
| Comparative D | Fe(NO$_3$)$_3$.9 H$_2$O | B$_2$O$_3$ | Fresh | 12 | 42 | 57 |
| Comparative E | Fe$_2$(SO$_4$)$_3$.H$_2$O | B$_2$O$_3$ | Fresh | 89 | 95 | 93 |
| Comparative F | Fe$_2$(SO$_4$)$_3$.H$_2$O | B$_2$O$_3$ | Aged | 13 | 46 | 54 |
| Comparative G | Fe$_2$(SO$_4$)$_3$.H$_2$O | P$_2$O$_5$ | Fresh | 89 | 95 | 93 |
| Comparative H | Fe$_2$(SO$_4$)$_3$.H$_2$O | P$_2$O$_5$ | Aged | 44 | 57 | 64 |
| Comparative I | Fe$_2$(SO$_4$)$_3$.H$_2$O | TiO$_2$ | Fresh | 92 | 97 | 97 |
| Comparative J | Fe$_2$(SO$_4$)$_3$.H$_2$O | TiO$_2$ | Aged | 55 | 73 | 78 |
| Comparative K | None | CeO$_2$ | Fresh | 59 | 82 | 74 |
| Example A | Fe$_2$(SO$_4$)$_3$.H$_2$O | CeO$_2$ | Fresh | 96 | 100 | 96 |
| Example B | Fe$_2$(SO$_4$)$_3$.H$_2$O | CeO$_2$ | Aged | 89 | 96 | 95 |

Various modifications may be made in the invention, the scope of which is defined in the following claims.

We claim:

1. In a process for removing NO$_x$ from a gas containing excess oxygen which involves adding NH$_3$ to the gas and passing the gas over a catalyst at a temperature of 250° C. to 500° C. to react the NO$_x$ with the NH$_3$, the improvement which comprises using, as the catalyst, a catalyst consisting essentially of iron sulfate carried by a mixture of ceria and alumina on a support, the ceria comprising 2-60% by weight of said mixture and the iron sulfate comprising from 0.5-50% by weight of said mixture.

2. The process of claim 1 wherein the gas is essentially SO$_x$-free.

* * * * *